United States Patent Office 3,217,481
Patented Nov. 16, 1965

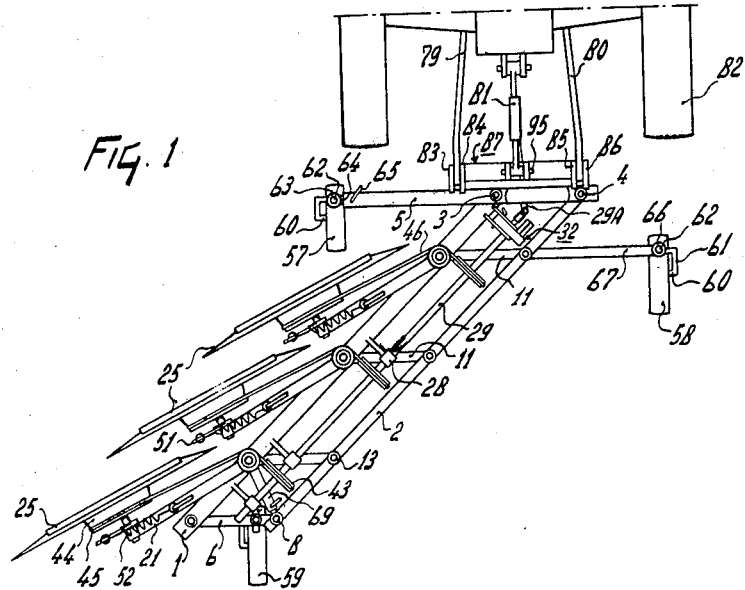

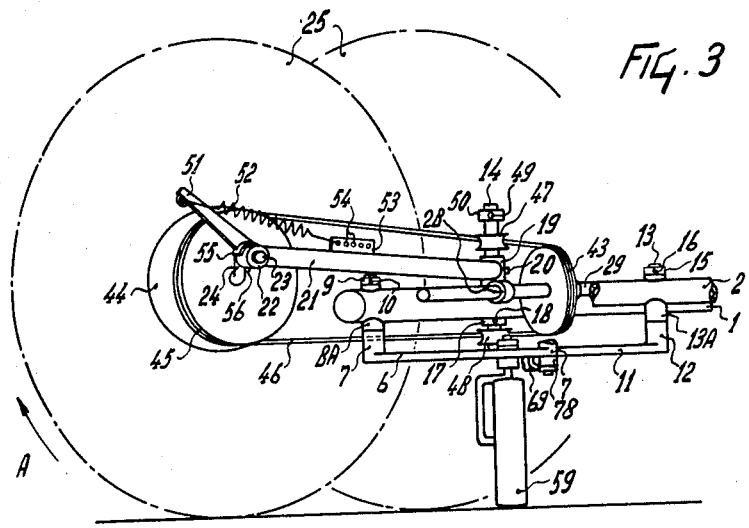

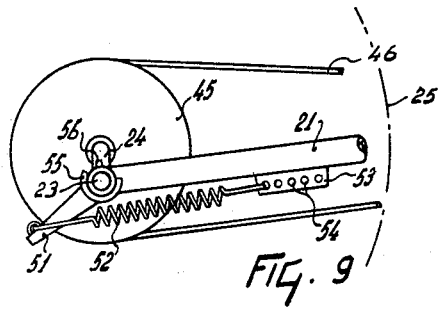
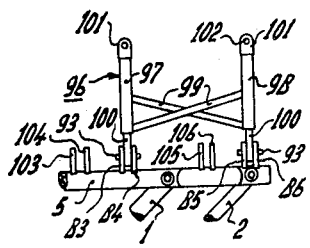
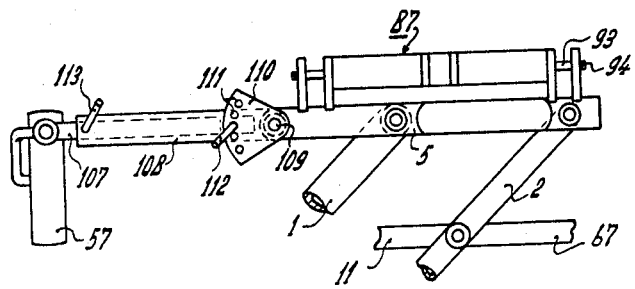
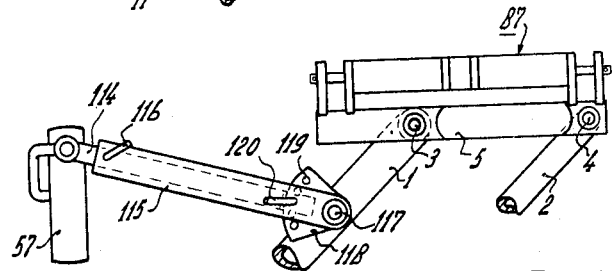
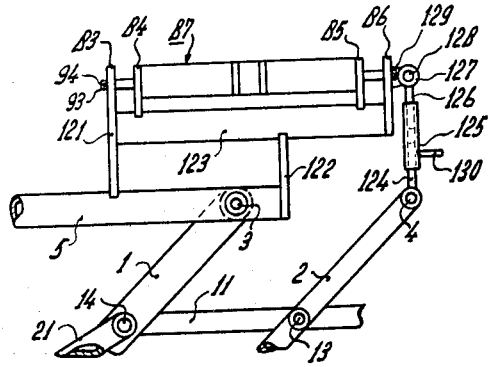

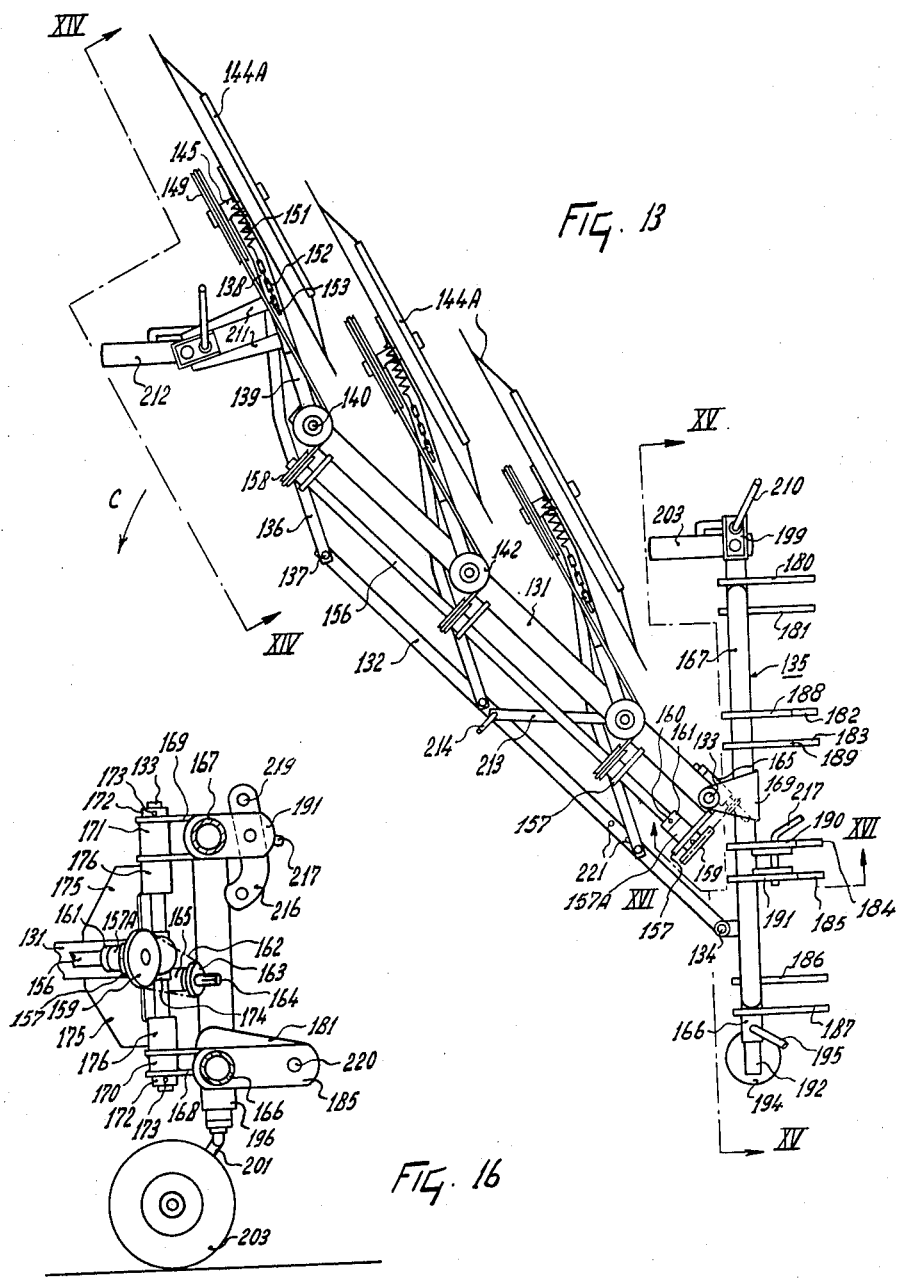

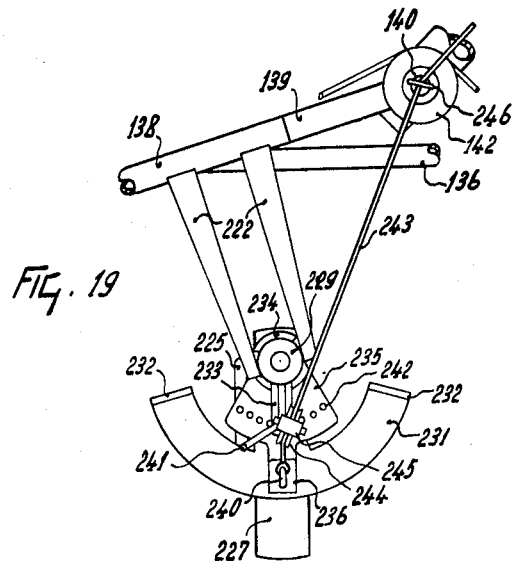
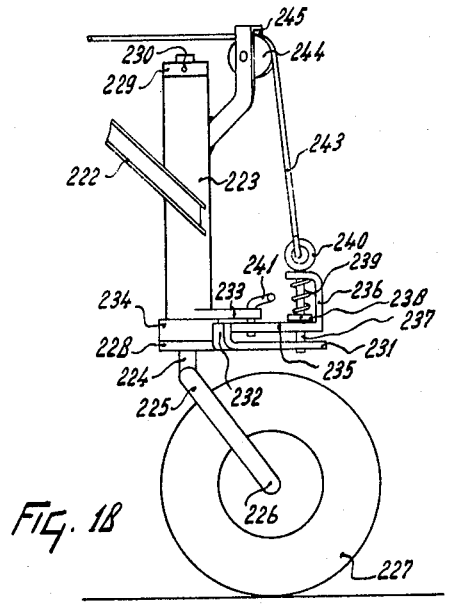

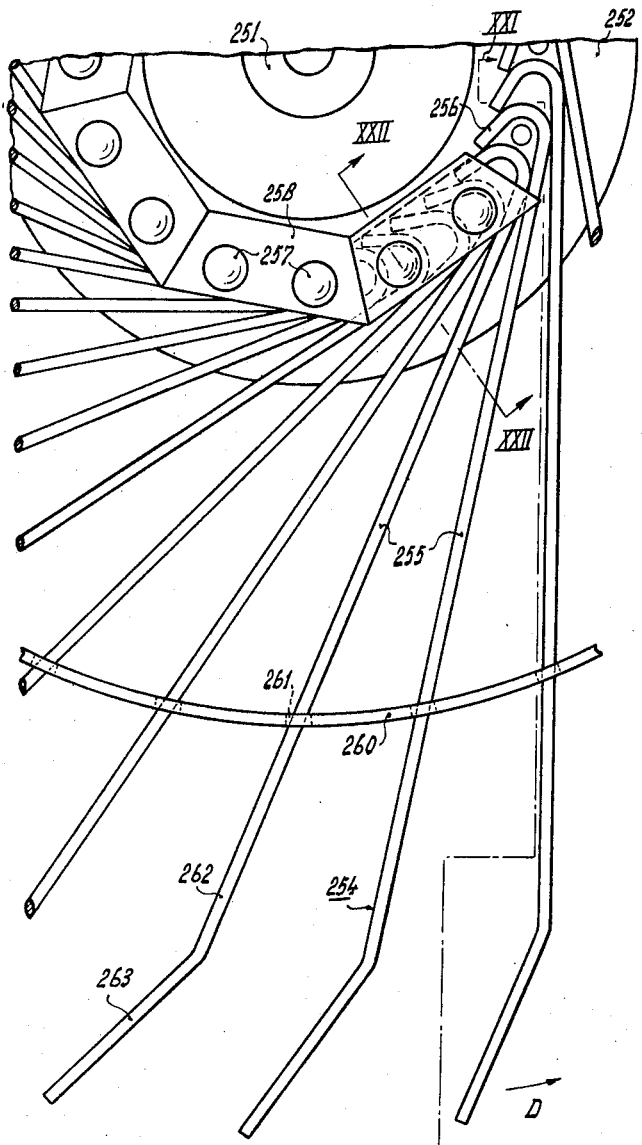
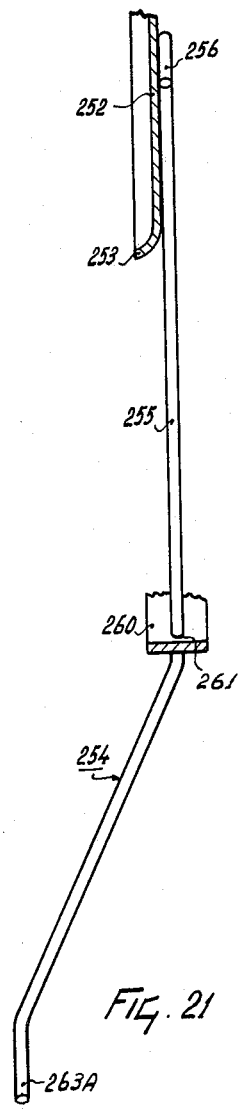
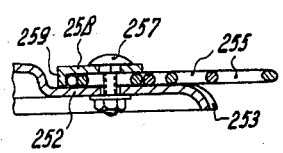

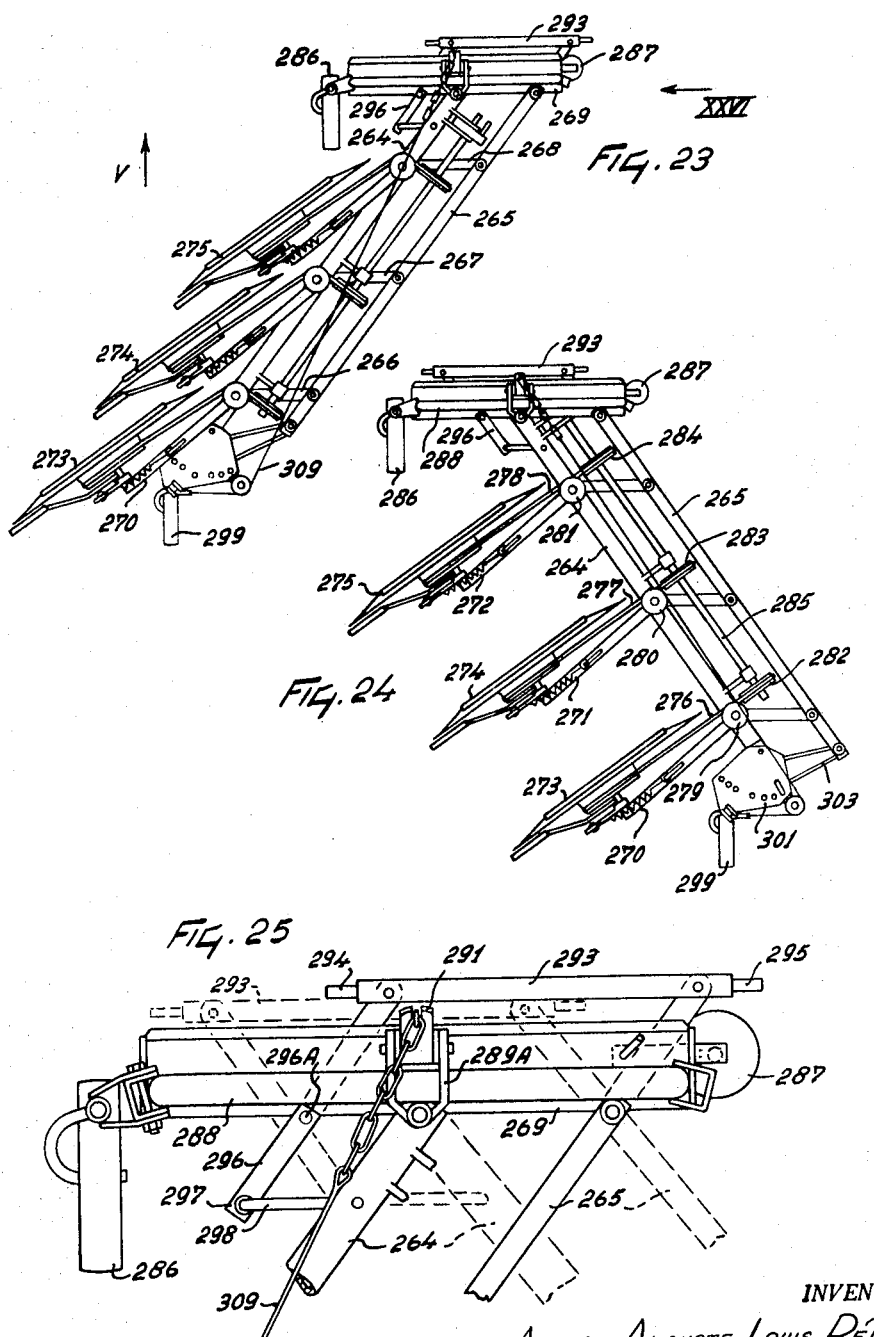

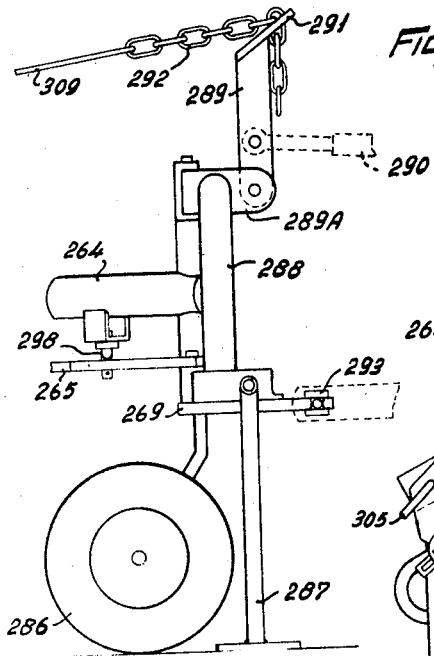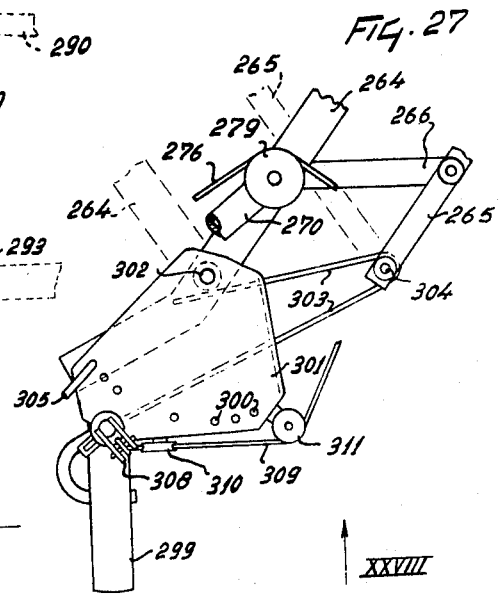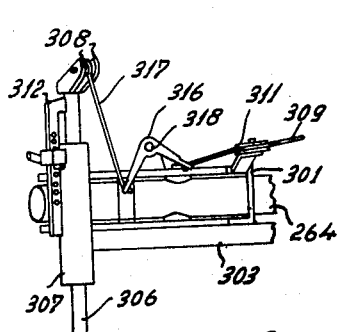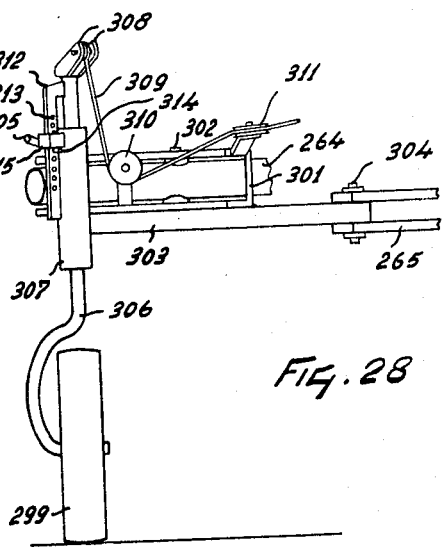

3,217,481
IMPLEMENTS FOR THE LATERAL DISPLACEMENT OF CROP OR LIKE MATERIAL LYING ON THE GROUND
Albert Auguste Louis Rémy, Senonches, France, assignor to C. van der Lely N.V., Maasland, Netherlands, a Dutch limited-liability company
Filed Apr. 11, 1962, Ser. No. 186,685
Claims priority, application Netherlands, May 4, 1961, 264,417; Aug. 4, 1961, 267,938
50 Claims. (Cl. 56—366)

This invention relates to implements for the lateral displacement of crop or like material lying on the ground, such implements being of the kind comprising a frame movable over the ground and a plurality of rake wheels carried by the said frame.

An object of the invention is the provision of an efficient implement which can readily be brought from one working position to another in a simple manner.

According to the invention, there is provided an implement of the kind set forth, wherein the frame includes a main frame beam and a parallel auxiliary frame beam interconnected by coupling beams in such a way as to constitute a parallelogram linkage turnable about vertical or substantially vertical pivotal axes, one of said coupling beams being provided with coupling members adapted for connection to a tractor or other propelling vehicle in such a way that the implement is substantially horizontally immovable relative to the tractor or other vehicle when so connected, the arrangement of the implement being such that it can be brought from a first to a second working position by changing the angular setting of the said parallelogram linkage.

For a better understanding of the invention, and to show how the same may be carried into effect, reference will now be made, by way of example, to the accompanying drawings, in which:

FIGURE 1 is a plan view of an implement in accordance with the invention, the implement being connected to the rear of a tractor and occupying a working position for use as a side-delivery rake;

FIGURE 2 is a plan view similar to FIGURE 1 but showing the implement occupying a working position for use as a tedder;

FIGURE 3 is an elevation, to an enlarged scale, as seen in the direction indicated by the arrow III of FIGURE 1;

FIGURE 4 is an elevation, to an enlarged scale, showing the coupling member by which the implement shown in FIGURES 1 and 2 is connected to a tractor;

FIGURE 5 is a sectional elevation, to an enlarged scale, showing part of the driving system by which the rake wheels of the implement are rotated;

FIGURE 6 is a plan view corresponding to FIGURE 5;

FIGURE 7 is a section, to an enlarged scale, taken on the line VII—VII of FIGURE 2;

FIGURE 8 is a plan view showing an alternative form of coupling between the implement and a vehicle;

FIGURE 9 is an elevation illustrating an alternative method of connecting a rake wheel to the frame of the implement;

FIGURE 10 is a plan view illustrating a second way of connecting a ground wheel to the frame of the implement;

FIGURE 11 is a plan view illustrating a third way of connecting a ground wheel to the frame of the implement;

FIGURE 12 is a diagrammatic plan view illustrating means for adjusting the working width of the implement;

FIGURE 13 is a plan view of a second embodiment of an implement in accordance with the invention, the said implement occupying a working position for use as a side-delivery rake;

FIGURE 16 is a section, to an enlarged scale, taken on the line XVI—XVI of FIGURE 13;

FIGURE 18 is an elevation illustrating an alternative way of connecting a ground wheel to the frame of the implement;

FIGURE 19 is a plan view corresponding to FIGURE 18;

FIGURE 20 is an elevation, to an enlarged scale, showing part of a rake wheel suitable for use with an implement in accordance with the invention;

FIGURE 21 is a section taken on the line XXI—XXI of FIGURE 20;

FIGURE 22 is a section taken on the line XXII—XXII of FIGURE 20;

FIGURE 23 is a plan view of a third embodiment of an implement in accordance with the invention, the implement occupying a working position for use as a side-delivery rake;

Figure 14:
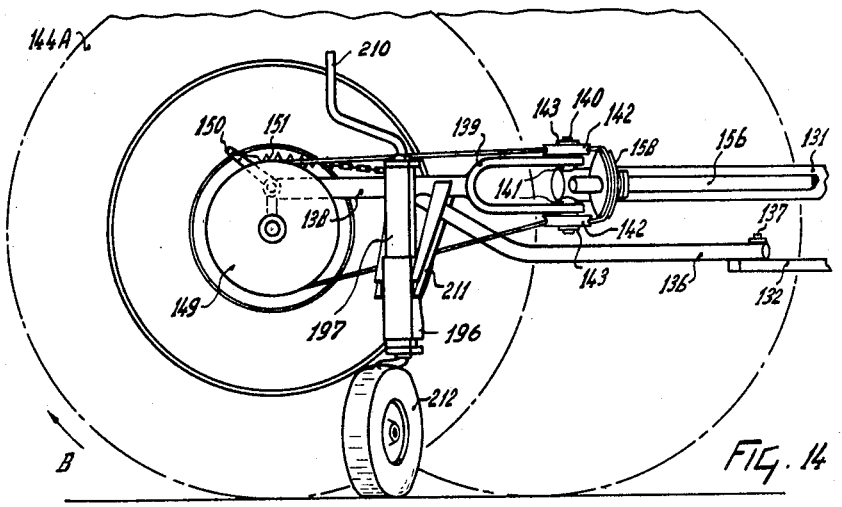
FIGURE 14 is an elevation, to an enlarged scale, taken in the direction indicated by the arrows XIV of FIGURE 13.

FIGURE 24 corresponds to FIGURE 23 but shows the implement occupying a working position for use as a tedder;

FIGURE 25 is a plan view, to an enlarged scale, showing the coupling of the implement of FIGURES 23 and 24 to the lifting device of a tractor;

FIGURE 26 is a view, to an enlarged scale, taken in the direction indicated by the arrow XXVI of FIGURE 23;

FIGURE 27 is a plan view, to an enlarged scale, showing the connection of a ground wheel to the frame of the implement in greater detail;

FIGURE 28 is an elevation as seen in the direction indicated by the arrow XXVIII of FIGURE 27; and FIGURE 29 corresponds to FIGURE 28 but shows an alternative embodiment of certain parts of the implement.

The implement shown in FIGURES 1 and 2 has a main frame beam 1 and an auxiliary frame beam 2 which extends parallel to the former frame beam. The leading ends of the beams 1 and 2 are pivotally connected to a coupling beam 5 by vertical shafts 3 and 4, respectively. The vertical shafts 3 and 4 are arranged in such a way that the beams 1 and 2 can turn about them but not move axially relative to them. The ends of the beams 1 and 2 remote from the coupling beam 5 are interconnected by a coupling beam 6 whose opposite ends are rigid with two vertical shafts 7 (FIGURE 3). The upper ends of the vertical shafts 7 are extended to form further vertical shafts 8 having a smaller diameter than the shafts 7. The shafts 8 are journalled in vertical bearings 8A lodged in bores in the beams 1 and 2, respectively. A collar 9 of approximately the same diameter as the vertical shafts 7 is secured to the upper extremity of each of the vertical shafts 8 by means of a small transverse pin 10 so that each of the beams 1 and 2 has a shaft 7 disposed below it and a collar 9 disposed above it.

The vertical shafts 3, 4 and 8 are disposed at the four corners of a parallelogram so that the frame beams 1 and 2 can turn about these shafts whilst remaining parallel to one another. The beams 1 and 2 are interconnected by three further coupling beams 11 each of which has a vertical shaft 12 secured to the end thereof disposed below the auxiliary frame beam 2. The upper end of each shaft 12 has an extension in the form of a further vertical shaft 13 of smaller diameter than the shaft 12. Each shaft 13 is journalled in a vertical bearing 13A lodged in a bore in the beam 2 and is provided at its uppermost extremity with a collar 15, of substantially the same diameter as the shaft 12, which is retained in position by a small transverse pin 16. The ends of the coupling beams 11 which lie below the frame beam 1 are secured to vertical shafts 14 which are journalled in further vertical bearings 13A lodged in bores in the frame beam 1. Each shaft 14 is prevented from moving axially relative to the corresponding bearing 13A by means of a collar 17 which lies below the bearing 13A and is retained in position by a small transverse pin 18 and by a sleeve 19 disposed above the bearing 13A and retained in position by a small transverse pin 20.

A vertical plane containing vertical shafts 4 and 8 associated with the auxiliary frame beam 2 also contains all the vertical shafts 13 and, in a similar manner, a vertical plane containing vertical shafts 3 and 8 associated with the frame beam 1 also contains all the shafts 14. A vertical plane containing any shafts 13 and 14 which are secured to the same coupling beam 11 extends parallel to a vertical plane containing the shafts 3 and 4 and also to a vertical plane containing both the shafts 8.

Each of the aforementioned sleeves 19 carries an arm 21 whose free end is provided with a horizontal bearing 22 in which a stub shaft 23 is journalled. Each stub shaft 23 forms one end of a crank 24 about the opposite end of which a rake wheel 25 is rotatable.

Two support lugs 26 and 27 (FIGURES 1 and 6) project from one side of the frame beam 1 immediately adjacent the leading end thereof. Further support sleeves 28 are connected to the same side of the frame beam 1 by brackets at intervals therealong, the supports 26 and 27 and sleeves 28 having a shaft 29 rotatably journalled therein. The shaft 29 extends parallel to the beams 1 and 2 and is secured against axial displacement by collars 30 and 31 which are rigidly secured to it and which lie on relatively opposite sides of the pair of support lugs 26 and 27 (see FIGURE 6). A housing 32 (FIGURES 1, 5 and 6) is provided between the support lugs 26 and 27. The housing 32 comprises two parallel plates 33 and 34 which also extend parallel to the lugs 26 and 27, the whole housing 32 being turnable about the axis afforded by the shaft 29. The housing 32 can be retained in different angular settings relative to this axis by entering a horizontal locking pin 35 through two aligned holes in the lugs 26 and 27 and through a selected one of a number of pairs of aligned holes 36 formed in the plates 33 and 34.

The housing 32 has two further shafts 37 and 38 rotatably journalled in it, the shafts 37 and 38 extending parallel to the previously mentioned shaft 29. The portions of the shafts 29, 37 and 38 which lie between the plates 33 and 34 of the housing 32 have pulleys 41, 39 and 40, respectively, secured to them. A belt or the like 42 (FIGURE 5) is engaged around the peripheries of the three pulleys. It will be apparent that the pulleys 39, 40 and 41 may be replaced by other transmission members such as sprockets and that the belt or the like 42 may be replaced by another transmission member such as a chain. In any case, the pulley or other member 41 has a diameter greater than that of either of the pulleys or other members 39 and 40 and the pulley or other member 40 has a diameter which is greater than that of the pulley or other member 39. The leading ends of the three shafts 29, 37 and 38 which project forwardly of the implement are splined or otherwise keyed as can be seen in FIGURE 6.

A pulley 43 is secured to the shaft 29 at each of three locations disposed close to a corresponding one of the vertical shafts 14. The hubs 44 of the three rake wheels 25 incorporate pulleys 45 and these are connected to the pulleys 43 by three endless ropes or the like 46 which, in the embodiment illustrated, have a circular cross-section. Each rope or the like 46 bears against a pair of guide pulleys 47 and 48 which are rotatably mounted on the upper and lower ends, respectively, of the corresponding vertical shaft 14. The upper guide pulley 47 is freely movable axially of the corresponding shaft 14 between the sleeve 19 and a collar 50 which is secured to the upper extremity of the shaft 14 with the aid of a small transverse pin 49. The lower guide pulley 48 is freely movable axially of the corresponding shaft 14 between the collar 17 and the coupling beam 11 which is secured to the lower end of the said shaft.

Each of the cranks 24 carries an arm 51 to the free end of which one end of a tension spring 52 is connected. The opposite end of the tension spring 52 is engaged with one of a row of holes 54 formed in a strip 53 mounted on the upper side of, and approximately mid-way along, the corresponding arm 21. The arrangement is such that the end of the springs 52 can be entered in any selected one of the holes 54. The arm 51 carries a cylindrically curved plate 55 which is concentric with the bearing 22 and disposed immediately adjacent the latter. A stop 56 projects from the bearing 22 in the path of the plate 55 so that the plate 55 and stop 56 together act to prevent the arm 51 and crank 24 from turning relative to the bearing 22 beyond predetermined limits. In the embodiment illustrated, the plate 55 and stop 56 are so dimensioned that, from an initial position in which the stub shaft 23 and the axle of the corresponding rake wheel 25 are contained in the same vertical plane with the stub shaft 23 located above the said axle, the crank 24 can only turn through about 45° towards the corresponding shaft 14 and through about 90° away from the said shaft 14.

The implement is supported on the ground by three castor ground wheels 57, 58 and 59 each of which is rotatable about a horizontal axle 60 that is connected to a vertical shaft 62 by an integral inclined coupling piece 61, the longitudinal axis of the shaft 62 being perpendicular to, and spaced from, the longitudinal axis of the axle 60. The vertical shaft 62 associated with the ground wheel 57 is journalled in a vertical bearing 63 fastened to one end of a beam 64, the said end projecting from one end of the tubular frame beam 5 within the greater part of the beam 64 is telescopically housed. The beam 64 is formed with a plurality of transverse holes and the beam 5 is formed with a single registering transverse hole so that, by the use of a vertical locking pin 65, the beam 64 can be retained in any one of a number of different positions of extension relative to the beam 5. The vertical shaft 62 associated with the ground wheel 58 is journalled in a vertical bearing 66 mounted at the free end of an extension 67 of the coupling beam 11 located closest to the frame beam 5. The vertical shaft 62 associated with the ground wheel 59 is journalled in a vertical bearing 68 mounted at an intermediate point along the length of the coupling beam 6. The rearmost of the three vertical shafts 14 considered in the intended direction of travel of the implement is prolonged below the corresponding coupling beam 11, the said prolongation turnably carrying a vertical bearing 70 which is prevented from dropping off the lower end of the vertical shaft 14 by a collar 72 which is secured to the shaft with the aid of a small transverse pin 71 (FIGURE 7). One end of a tube 69 projects horizontally from the bearing 70, the tube 69 telescopically housing a further tube 73 which, in turn, telescopically houses a still further tube 75. The tubes 69, 73 and 75 are formed with series of vertically aligned holes so that, as can be seen in FIGURE 7, they can be retained in desired positions of extension relative to one another with the aid of two vertical locking pins 74 and 76. The free end of the tube 75 carries a vertical bearing 78 which is turnable about a vertical shaft 77 afforded by a downward extension of the vertical shaft 8 associated with the auxiliary frame beam 2. The bearing 78 is prevented from dropping off the lower end of the shaft 77 by a collar 78A secured to the lower extremity of the said shaft 77.

FIGURES 1 and 2 show the implement coupled to the lifting links 79, 80 and 81 of the three-point lifting device of a tractor 82. The frame beam 5 is accordingly provided with coupling members in the form of two pairs 83, 84 and 85, 86 of support lugs which project forwardly therefrom to co-operate with the lifting links 79 and 80 and with a further coupling member 87 which can be seen in greater detail in FIGURE 4. The coupling member 87 comprises a curved beam 88 to the opposite ends of which are secured two beams 89 and 90. The portions of the beams 89 and 90 which are secured to the beam 88 extend parallel to one another and merge into further relatively converging portions which terminate in two further parallel and adjacent portions, the latter portions being interconnected by a transverse connecting piece 91. The connecting piece 91 is joined to the center of the curved beam 88 by a strengthening strut 92. The lowermost parallel portions of the beams 89 and 90 are spaced apart by a distance which is such that they can be entered between the two support lugs 84 and 85.

The lowermost ends of the beams 89 and 90 can be pivotally connected, as shown in FIGURE 4, to the support lugs 83, 84, 85 and 86 with the aid of two aligned horizontal pivot pins 93. The same pins act, as can be seen in outline in FIGURES 1 and 2, to connect the support lugs 83, 84, 85 and 86 and the coupling member 87 to the lower lifting links 79 and 80 since these links can be interposed between the support lugs 83, 84 and 85, 86 respectively. The pivot pins 93 are retained against axial displacement by entering resilient "safety" pins, split pins or the like 94 through transverse bores adjacent their opposite ends. It will be seen from FIGURE 4 that the lowermost extremities 89A and 90A of the beams 89 and 90 are bent over through 90° so that they lie beneath, but spaced from, the support lugs 84 and 85, respectively.

In the use of the implement, the shaft 29 is connected to the power take-off shaft of the tractor 82 with the aid of an intermediate transmission shaft 29A. The transmission shaft 29A may be coupled directly to the forwardly projecting end of the shaft 29 or, alternatively, to the adjacent end of one of the two shafts 37 and 38. Assuming a constant speed of rotation of the power take-off shaft of the tractor 82, the speed of rotation of the shaft 29 will vary in dependence upon which of the three possible shafts the transmission shaft 29A is coupled to. The speed of rotation will be greatest when the shaft 29 itself is chosen and least when the shaft 37 is chosen. This simple arrangement makes it possible for any one of three different speeds of rotation of the rake wheels 25 to be chosen in accordance with the nature of the crop to be worked and the operating conditions generally.

The transmission shaft 29 is passed beneath the concave side of the curved beam 88 (FIGURE 4) and, in order to ensure that there shall always be adequate clearance between this shaft and other members such as the beams 5 and 88, the housing 32 can be turned about the axis of the shaft 29 and secured by the locking pin 35 in an appropriate setting. The positions of the leading ends of the shafts 37 and 38 relative to the other parts of the implement and to the tractor can thus be varied. Upon rotation of the shaft 29, the rake wheels 25 are rotated in the direction indicated by the arrow A in FIGURE 3 through the intermediary of the ropes or the like 46.

When the implement occupies the position shown in FIGURE 1 each of the rake wheels 25 displaces crop laterally into the path of the following rake wheel so that all the displaced crop is formed into a single swath or window to the left of the last rake wheel 25 considered in the intended direction of travel of the implement. Thus, when the implement occupies the working position shown in FIGURE 1, it functions as a side-delivery rake.

By adjustment of the angular setting of the parallelogram linkage afforded by the frame beams 1 and 2, the coupling beams 5 and 6 and by the vertical shafts 3, 4 and 8, the implement can be brought to the working position illustrated in FIGURE 2, the coupling beam 5 remaining fixed in position during the said adjustment. The planes of rotation of the rake wheels 25 which, in the working position of FIGURE 1 extend very approximately parallel to the frame beam 1, extend substantially perpendicular to that frame beam in the working position of FIGURE 2. Both the working positions illustrated are maintained by suitable relative axial adjustment of the tubes 69, 73 and 75 and by the insertion of the locking pins 74 and 76 in aligned holes in both cases. The said tubes and locking pins maintain a chosen angular setting of the frame due to the fact that the tubes substantially rigidly interconnect two points, the lines of connections being inclined to the vertical plane containing the shafts 3 and 4.

During use of the implement in the working position illustrated in FIGURE 2, each rake wheel 25 displaces crop laterally independently of its fellows so that the implement functions as a tedder. The direction of rotation of the rake wheels 25 is the same in this case as in the working position illustrated in FIGURE 1. Each tension spring 52 tends to turn the corresponding crank 24, together with the rake wheel 25 rotatably mounted thereon, in the direction A about the corresponding stub shaft 23. The axis of rotation of the rake wheel 25 thus tends to be moved further away from the corresponding vertical shaft 14 so that the spring 52 maintains tension in the rope or the like 46 and compensates for any minor variations in the length of the latter. Upon a rake wheel 25 encountering a strong resistance to its rotation, such as a large accumulation of crop, the force transmitted through the uppermost run of the rope or the like 46 increases and this also tends to turn the rake wheel as a whole, together with the crank 24, about the stub shaft 23. Accordingly, the arrangement is such that an increase in the resistance to rotation of a rake wheel 25 in the direction A causes a consequent tightening of the rope or the like 46 so that any tendency to slipping of the latter is reduced. The use of the cranks 24 also allows the rake wheels 25 to move vertically to a limited extent to match undulations in the surface of the ground over which the implement is moving.

The implement as a whole can move vertically relative to the tractor 82 by turning about the horizontal axis afforded by the pins 93 to match undulations in the surface of the soil over which the tractor and implement are moving. The implement can be lifted clear of the ground for transport from one place to another by raising the links 79, 80 and 81 of the three-point lifting device of the tractor 82. The implement as a whole will turn downwardly about the axis afforded by the pins 93 but such turning movement is limited by the extremities 89A and 90A of the beams 89 and 90 coming into abutting engagement with the support lugs 84 and 85. The inclinations of the planes of rotation of the rake wheels 25 to the intended direction of travel of the implement and also the width of the strip of land which is worked by the implement can be adjusted by making minor variations in the angular setting of the parallelogram linkage of the frame. This can be done by appropriate axial manipulation of the tubes 69, 73 and 75 with the aid of the locking pins 74 and 76. The ground wheels 58 and 59 are bodily displaced with the parallelogram linkage of the frame and, as can be seen in FIGURES 1 and 2, occupy appropriate settings in either of the two working positions which are illustrated.

FIGURE 8 shows an auxiliary coupling piece which is generally indicated by the reference numeral 96, this coupling piece being intended to enable the implement to be connected to a tractor having a tow bar or the like instead of a lifting device. The auxiliary coupling piece 96 is comprised by two parallel beams 97 and 98 which are rigidly interconnected by struts 99. Each of the beams 97 and 98 is provided at one end with a vertical plate 100, the two plates 100 being spaced apart by a distance which is such that one of them can be entered between the support lugs 83 and 84 whereas the other is entered between the support lugs 85 and 86. The plates 100 co-operate turnably with the support lugs with the aid of the aforementional pins 93. The opposite ends of the beams 97 and 98 are provided with forks 101 having horizontal limbs in which vertically aligned holes 102 are formed. The forks 101 are intended to co-operate with the tow bar or the like of a tractor with the aid of two vertical locking pins in such a way that the implement is substantially horizontally immovable relative to the tractor as is the case when the implement is connected to the lifting device of a tractor as previously described.

As can be seen in FIGURE 8, two further pairs 103, 104 and 105, 106 of support lugs are provided, these lugs being spaced a short distance along the beam 5 relative to the previously mentioned lugs 83, 84, 85 and 86. Either the coupling piece 87 (FIGURE 4) or the auxiliary coupling piece 96 (FIGURE 8) may be used in association with the lugs 103 to 106 so that the implement may occupy different lateral positions relative to the longitudinal axis of the tractor or other vehicle which is used to propel it.

FIGURE 9 shows an alternative arrangement to that illustrated in FIGURE 3 for the connection of one of the rake wheels 25 to one of the arms 21. In this embodiment the tension spring 52 is located beneath the arm 21. The position illustrated is one in which the axis of rotation of the rake wheel 25 is contained in the same vertical plane as the stub shaft 23 and the arrangement is such that the rake wheel is bodily turnable about the stub shaft 23 through approximately 45° towards the corresponding vertical shaft 14 out of the position illustrated and through approximately 90° away from the said shaft.

FIGURE 10 shows an alternative arrangement for the mounting of the ground wheel 57. In this arrangement, the beam 107 to which the ground wheel 57 is coupled is slidable telescopically within a tube 108 which is hinged to the end of the beam 5 with the aid of a vertical pivot 109. A sector plate 110 is rigidly secured to the beam 5 and is formed with a number of holes 111 any one of which can register with a vertical hole through the tube 108. A vertical locking pin 112 is provided for entry through a chosen hole 111 and the said hole in the tube 108. A further vertical locking pin 113 is entered through registering holes in the tube 108 and the beam 107 an is employed to retain the beam 107 in a desired position of extension relative to the tube 108.

FIGURE 11 shows a further alternative arrangement for the mounting of the ground wheel 57. In this case, the ground wheel 57 is connected to a beam 114 which is slidable telescopically within a tube 115 hinged to the main frame beam 1 adjacent the vertical shaft 3 with the aid of a vertical pivot 117. A vertical locking pin 116 is used in a similar manner to the locking pin 113 to retain the beam 114 in a desired position of extension relative to the tube 115. A sector plate 118 is secured to the main frame beam 1 and is formed with a number of holes 119 any one of which can register with a vertical hole formed through the tube 115. A vertical locking pin 120 is provided for entry through a selected hole 119 and the hole in the tube 115 to retain the latter in a desired angular setting about the pivot 117.

FIGURE 12 shows an arrangement by which the parallelogram linkage of the frame can be turned to a limited extent about a vertical axis to vary the effective width of the implement. The coupling beam 5 is connected to a further beam 123 with the aid of two supports 121 and 122 to which latter the previously described support lugs 83, 84, 85 and 86 are secured. The coupling piece 87 is shown connected to these lugs with the aid of the pins 93 but, if desired, the auxiliary coupling piece 96 illustrated in FIGURE 8 may be used in its place. The coupling beam 5 is shortened so that only the main frame beam 1 is directly connected to it with the aid of the vertical shaft 3. The vertical shaft 4 at the leading end of the auxiliary frame beam 2 is pivotally connected to one end of a screw-threaded rod 124 whose opposite end is entered in one end of a screw-threaded sleeve 125. The opposite end of the sleeve 125 is formed with an oppositely pitched screw-thread and receives one end of a correspondingly screw-threaded rod 126. The opposite end of the rod 126 carries a vertical bearing 127 which is turnable about a vertical shaft 128 secured to a lug 129 projecting laterally from the support lug 86. The sleeve 125 has a handle 130 and it will be evident that, upon rotation of the sleeve 125 with the aid of this handle, the distance between the vertical shafts 4 and 128 will be either increased or decreased. Thus, the whole of the parallelogram linkage of the frame will be turned about the vertical shaft 3 in a corresponding direction to increase or decrease the effective width of the implement. The beam 123 remains substantially horizontally immovable relative to a tractor which is connected to the coupling piece 87.

FIGURE 13 shows an alternative embodiment of an implement in accordance with the invention, the implement comprising a main frame beam 131 and an auxiliary frame beam 132 which beams extend parallel to one another with the latter beam at a lower level than the former. The beams 131 and 132 are respectively connected to a coupling beam in the form of a further part 135 of the frame with the aid of vertical shafts 133 and 134. The auxiliary frame beam 132 is connected to three coupling members 136 by three vertical shafts 137, each coupling member 136 having the end thereof remote from the frame beam 132 rigidly secured to a corresponding arm 138. Each arm 138 has a forked bracket 139 at one end, the bracket being turnable about a vertical shaft 140 which is journalled in a bearing 141 (FIGURE 14) mounted in a bore in the main frame beam 131. The limbs of each bracket 139 are disposed respectively above and below the main frame beam 131 so that the said bracket is substantially axially immovable of the corresponding shaft 140. The upper and lower projecting ends of the shaft 140 carry rotatable pulleys 142 which are prevented from becoming disengaged from the said shaft by collars 143 secured to the opposite extremities of the shaft.

Figure 17:
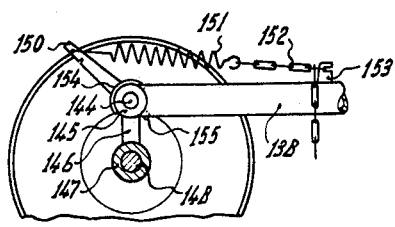
FIGURE 17 is a fragmentary view showing some of the parts illustrated in FIGURE 14 in greater detail.

A rake wheel 144A is connected to the free end of each of the three arms 138. The end of each arm 138 carries a horizontal bearing 145 in which a stub shaft 144 is freely turnable, the stub shaft 144 projecting from one end of a relatively perpendicular arm 146 whose opposite end carries a horizontal bearing 147 in which is journalled an axle 148 secured to the hub of the rake wheel 144A (see FIGURE 17).

The stub shaft 144 also carries an upwardly inclined arm 150 to the free end of which one end of a tension spring 151 is linked. The other end of the tension spring 151 is connected by way of a chain 152 to a hook 153 secured to the upper side of the arm 138. The arm 150 carries a cylindrically curved plate 154 and the bearing 145 carries a stop 155, these parts co-operating to limit bodily displacement of the rake wheel 144A about the stub shaft 144 in the manner previously described with reference to FIGURES 3 and 9. The end of the axle 148 which is remote from the rake wheel 144A and which projects from the bearing 147 carries a pulley 149. The rake wheel 144A is thus rotatable about the axle 148 and also bodily displaceable about the stub 144 which extends parallel to the axle 148 at a short distance therefrom.

Referring again to FIGURE 13, it can be seen that a rotatable shaft 156 extends parallel to the beams 131 and 132 and is journalled in support lugs 157 projecting from one side of the beam 131. The shaft 156 is provided with three pulleys 158 which are respectively located adjacent the three vertical shafts 140. A sprocket 159 is secured to the leading end of the shaft 156, the said sprocket bearing against one of the lugs 157. The lug in question supports a horizontal bearing 157A for the shaft 156 and a collar 161 which is secured to the shaft 156 with the aid of a small transverse pin 160 bears against the end of the bearing 157A remote from the sprocket 159. This arrangement ensures that the shaft 156 cannot move axially to any appreciable extent. A chain 162 (FIGURE 16) connects the sprocket 159 with a further smaller sprocket 163 which is mounted on a shaft 164. The shaft 164 has a portion to the rear of the sprocket 163 journalled in a horizontal bearing 165 fastened to the beam 131. The opposite leading end of the shaft 164 is splined or otherwise keyed to enable it to be connected to an intermediate transmission shaft.

Figure 15:
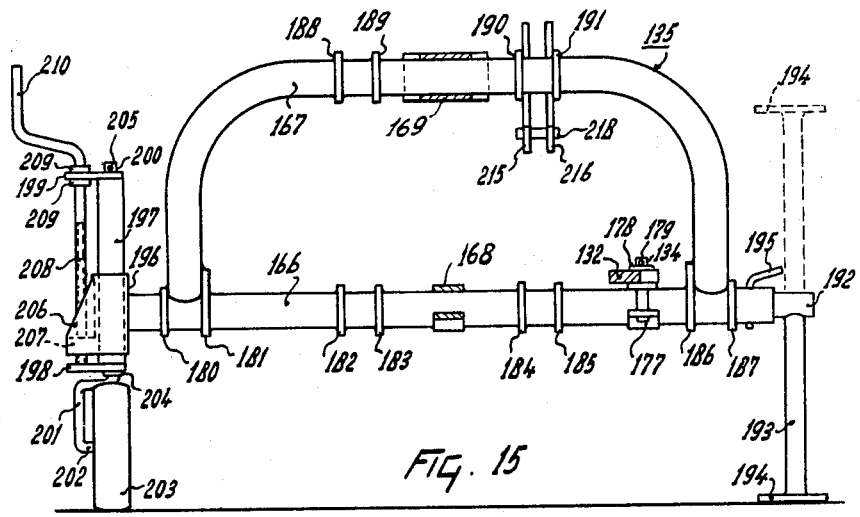
FIGURE 15 is a section, to an enlarged scale, taken on the line XV—XV of FIGURE 13.

The frame part 135 includes a horizontal frame beam 166 (FIGURE 15) and an inverted U-shaped frame beam 167, the base of the U extending parallel to the frame beam 166. Two brackets 168 and 169 are respectively arranged around the center of the frame beam 166 and the relatively parallel portion of the frame beam 167, these brackets serving for the support of vertical bearings 170 and 171 (FIGURE 16) in which bearings the vertical shaft 133 is journalled. The shaft 133 is secured against axial displacement by upper and lower collars 172 secured to the extremities of the shaft 133 with the aid of small transverse pins 173. The shaft 133 is also entered through a vertical bearing 174 secured to the leading end of the main frame beam 131. The main frame beam 131 also carries a plate 175 to which vertically disposed sleeves 176 are secured at its upper and lowermost ends, the sleeves 176 being engaged around the vertical shaft 133 immediately above and below the brackets 168 and 169, respectively. These sleeves 176 thus restrict axial movement of the bearing 174 relative to the shaft 133 to a very small extent.

The vertical shaft 134 is journalled in holes in the limbs of a bracket 177 (FIGURE 15) arranged around the frame beam 166. The leading end of the frame beam 132 bears against the upper limb of the bracket 177, the shaft 134 being welded or otherwise secured to the bracket 177 so that the said end of the beam 132 is located between the said limb of the bracket 177 and a washer 178 which is retained in position by a small transverse split pin or the like 179. The frame beam 166 is entered through holes in eight vertical plates 180, 181, 182, 183, 184, 185, 186 and 187 which, as can be seen in FIGURE 13, project forwardly of the said beam. The plates are arranged in pairs to form coupling members, the distance between the pair 180, 181 and the pair 184, 185 being equal to the distance between the pair 182, 183 and the pair 186, 187. The frame beam 167 is similarly entered through holes in four forwardly projecting plates 188, 189, 190 and 191, these plates being arranged in two pairs. The pair 188, 189 is arranged mid-way between the two pairs 180, 181 and 184, 185 while the pair 190, 191 is similarly arranged mid-way between the pair 182, 183 and the pair 186, 187.

The tubular frame beam 166 telescopically houses a further tubular beam 192 which projects from the end of the beam 166 adjacent the plate 187. The projecting end carries a further relatively perpendicular tube 193 to which a foot or plate 194 is secured. Transverse holes are formed through the tubular beams 166 and 192 and a vertical locking pin 195 can be employed to retain the tube 193, together with the foot or plate 194, in either the position shown in full lines or the position shown in broken lines in FIGURE 15.

The opposite end of the beam 166 carries a channel-shaped guide 196 between the limbs of which a square beam 197 is vertically slidable. The lower and upper ends of the beam 197 carry horizontal plates 198 and 199, respectively, and a vertical shaft 200 is rotatably journalled in an axial bore in the beam 197. The lowermost end of the shaft 200 is integrally connected via an inclined portion 201 to a horizontal axle 202 upon which a ground wheel 203 is freely rotatable. The longitudinal axis of the shaft 200 does not intersect the longitudinal axis of the axle 202 so that the ground wheel 203 is a castor wheel. The shaft 200 is retained against axial displacement relative to the beam 197 by a collar 204 which is secured to it immediately below the plate 198 and by a small transverse pin 205 which is entered through it immediately above the plate 199. A block 207 having a screw-threaded vertical bore is disposed between the vertical flanges 206 of the channel-shaped guide 196, the said bore receiving a correspondingly screw-threaded vertical rod 208 the lower end of which is freely journalled in a hole in the plate 198 and the upper end of which is entered rotatably through a hole in the plate 199. Collars 209 are secured to the rod 208 immediately above and below the plate 199 so that the said rod is substantially axially immovable while being capable of being turned in either direction by an integral crank handle 210 formed at its uppermost end. Rotation of the rod 208 by means of the handle 210 moves the axle 202 of the ground wheel 203 either upwardly or downwardly relative to the remainder of the implement.

The arm 138 by which the rearmost rake wheel 144A (FIGURE 14) is supported also has a guide 196 connected to it by inclined struts 211. A ground wheel 212 is connected to the guide 196 in substantially the same manner as has just been described with reference to FIGURE 15 in connection with the ground wheel 203.

In order to be able to retain the parallelogram linkage of the frame of the implement in desired angular settings, a strip 213 has one end pivotally connected to the main frame beam 131, its opposite end being formed with a hole which can be brought into register with any one of a number of holes 221 formed in the auxiliary frame beam 132. A vertical locking pin 214 is provided for entry through the hole in the strip 213 and a chosen one of the holes 221 to retain the parallelogram linkage of the frame in a corresponding angular setting.

The coupling member afforded by the pair of plates 190, 191 has an intermediate piece connected to it, the intermediate piece comprising two parallel plates 215 and 216. The intermediate piece is pivotally connected to the plates 190 and 191 with the aid of a horizontal locking pin 217 which is entered through registering holes in the four plates. The lowermost curved ends (see FIGURE 16) of the plates 215 and 216 are rigidly interconnected by a horizontal pin 218 whereas the uppermost ends of the same plates are formed with horizontally aligned holes 219. The plates 180, 181, 182, 183, 184, 185, 186 and 187 which are secured to the beam 166 are provided with horizontally aligned holes 220.

The implement can be connected to the three-point lifting device of a tractor or other vehicle by employing horizontal locking pins to connect the plates 182, 183 and 186, 187 to the free ends of the lower lifting links, respectively, and by employing a further locking pin to couple the free end of the upper lifting link to the plates 215 and 216 with the aid of the holes 219. The implement is then substantially horizontally immovable relative to the said tractor or other vehicle. If desired, the implement can be laterally displaced relative to the longitudinal axis of the tractor or other vehicle by employing the pair of plates 180, 181, the pair of plates 184, 185 and the pair 188, 189 instead of the plates just mentioned.

In the latter case, the intermediate piece is connected to the plates 188 and 189 instead of to the plates 190 and 191 with the aid of the locking pin 217.

When the implement occupies the working position illustrated in FIGURE 13, it is adapted to function as a side-delivery rake, the leading end of the shaft 164 being coupled to the power take-off shaft of the tractor or like vehicle which is arranged to propel the implement with the aid of an intermediate transmission shaft such as the shaft 29A previously mentioned. The rake wheels 144A are driven so that they rotate in the direction indicated by the arrow B (FIGURE 14), each of them being movable to a limited extent in vertical directions relative to the frame of the implement and the implement as a whole being turnable about a substantially horizontal axis relative to the said tractor or other vehicle. This axis is afforded by the locking pins or the like which are entered in the holes 220 since the upper lifting link of the lifting device of the tractor or other vehicle is connected to the implement through the intermediate piece afforded by the plates 215 and 216. However, when it is desired to lift the implement clear of the ground with the aid of the lifting device, the intermediate piece turns about the locking pin 217 until its lowermost curved ends meet the lower side of the frame beam 167. When this position is reached, the implement can turn no further about the locking pins or the like entered through the holes 220 and the whole implement can be raised without any further downward pivotal movement taking place.

The implement can be brought to a second working position for use as a tedder by releasing the locking pin 214 and turning the parallelogram linkage of the frame relative to the frame part 135 in the direction indicated by the arrow C in FIGURE 13. In the second working position the planes of rotation of the rake wheels 144A are arranged substantially perpendicular to the main frame beam 131 in a similar manner as has previously been described with reference to FIGURE 2. The new angular setting of the frame is retained by aligning the hole in the free end of the strip 213 with a suitable one of the holes 221 in the auxiliary frame beam 132 and replacing the locking pin 214.

It will be apparent that, when required, the implement illustrated in FIGURE 13 can be connected to a tractor or like vehicle having a tow bar with the aid of the auxiliary coupling piece 96 illustrated in FIGURE 8. The auxiliary coupling piece 96 is connected to either of the two sets of plates which are secured to the frame beam 166 to achieve this.

Under certain circumstances, such as when the implement is to be used frequently on hillsides or other sloping land, it is desirable that the rearmost ground wheel of the implement should be capable of resisting the consequent forces which act transverse to the direction of travel of the implement. Under these circumstances, the implement which has just been described may be modified by adopting the construction illustrated in FIGURES 18 and 19. The rearmost arm 138 has a vertical tube 223 connected to it by inclined struts or the like 222. A vertical shaft 224 is journalled in the tube 223, the said shaft having a horizontal axle 226 integrally connected to it by an inclined portion 225. The longitudinal axis of the shaft 224 does not intersect that of the axle 226 so that the ground wheel 227 which is rotatably mounted on the axle 226 is a castor wheel. The shaft 224 is prevented from shifting axially relative to the tube 223 by a plate 228 which is secured to it immediately below the said tube and by a collar 229 which is secured to it immediately above the tube by a small transverse pin 230. The plate 228 carries a further arcuately curved plate 231 whose center of curvature coincides with the longitudinal axis of the shaft 224. The opposite ends 232 of the plate 231 are bent upwardly through 90°.

At a short distance above the plate 228 the tube 223 has a horizontal lug 233 projecting from it and, between the plate 228 and the lug 233, the tube 223 is surrounded by a sleeve 234 which carries a horizontally disposed sector plate 235 formed with a plurality of holes 242. A U-shaped bracket 236 is, in turn, carried by the sector plate 235, one of the limbs of the bracket being coplanar with the sector plate 235 whereas the other is disposed parallel to the said plate but at a distance above it. The limbs of the bracket are formed with vertically aligned holes through which a locking pin 237 is entered. The portion of the locking pin 237 which is disposed between the limbs of the bracket 236 carries a collar 238 and a helical compression spring 239 bears between this collar and the upper limb of the said bracket. Thus, the tip of the locking pin 237 is urged vertically downwardly into engagement with the arcuately curved plate 231. The uppermost end of the locking pin 237 disposed above the bracket 236 carries a ring 240. The lug 233 is formed with a hole which can register with any of the holes 242 in the sector plate 235 and a vertical locking pin 241 is provided for entry through these holes to prevent the sector plate 235 and sleeve 234 from turning relative to the tube 223.

The arcuately curved plate 231 is formed with a single hole and the plane of rotation of the ground wheel 227 can be prevented from turning about the vertical axis afforded by the shaft 228 by entering the tip of the locking pin 237 through this hole. A cord or the like 243 is connected to the ring 240 and passes around a guide pulley 244 mounted on a bracket 245 secured to the tube 223 and also through eyes 246 mounted at the upper ends of the vertical shafts 140. The cord or the like 243 thus extends above and parallel to the main frame beam 131 and has its free end disposed in a position which is accessible to the driver of the tractor or other vehicle which propels the implement.

In the use of an implement having its rearmost ground wheel arranged as described with reference to FIGURES 18 and 19, the tip of the locking pin 237 is entered through the hole in the arcuately curved plate 231 at times when the implement is travelling in a straight line. Angular displacement of the ground wheel 227 about the axis of the shaft 224 is thus prevented which improves the stability of the implement when it is being used on a sloping field. When the implement has to negotiate a bend, the driver of the tractor or other vehicle which is propelling it pulls the cord 243 so as to disengage the locking pin 237 from the plate 231 against the action of the spring 239. The plane of rotation of the ground wheel 227 can then turn freely about the axis of the shaft 224 within the limits imposed by the upwardly bent ends 232 of the plate 231 which ends are contacted by the lowermost limb of the bracket 236 if an attempt is made to negotiate too steep a bend. As soon as straight-line travel is recommenced, the plane of rotation of the castor ground wheel 227 becomes parallel to the direction of travel and the tip of the locking pin 237 soon comes into register with the hole in the plate 231 and snaps into the same under the action of the spring 239. If the implement is of the kind having a variable working width, it is necessary to ensure that when the locking pin 237 is engaged in the hole in the plate 231 the plane of rotation of the ground wheel 227 is substantially parallel to the direction of travel of the implement whatever working width is selected. The locking pin 241 can be released and the sector plate 235 and arcuately curved plate 231 turned about the axis of the shaft 224 with the ground wheel 227 until the plane of rotation of the latter occupies the desired setting just mentioned. When the said setting is reached, the locking pin 241 is re-entered through the hole in the lug 233 and that one of the holes 242 which is closest to registering therewith.

FIGURES 20 to 22 illustrate a rake wheel which is particularly suitable for use with raking implements of the kind which have been described; that is to say, implements in which the rake wheels are mechanically driven rather than being driven by peripheral contact with the ground. The rake wheel illustrated has a central hub 251 to which a plate 252 is secured, the plane of this plate being substantially perpendicular to the axis of rotation of the rake wheel. The plate 252 has a bent-over rim 253. A plurality of tines which are generally indicated by the reference numeral 254 are secured to the plate 252 with the aid of clamping plates 258 and bolts 257. Each tine has a straight support portion 255 and a curved V-shaped end 256, the ends 256 being arranged partly around one another and the shank of one of the bolts 257 being entered between the limbs of the V of every second end 256. Moreover, each clamping plate 258 has a bent-over edge 259 (FIGURE 22) against which the extremities of the bent ends 256 bear. Each straight portion 255 is entered through a hole 261 formed in a felly 260, that part of each tine 254 which projects radially outwardly of the felly 260 being the crop-working part thereof.

As can be seen in FIGURE 20, the longitudinal axis of each straight portion 255 is inclined to a line joining the hub 251 to the hole 261 through which the same straight portion 255 is entered. The angle of inclination is preferably between 15° and 25° and, in the embodiment illustrated, is 22½°. Viewed in a direction parallel to the axis of rotation of the rake wheel (FIGURE 20), a radially innermost portion 262 of the crop-working part of each tine 254 is in line with the corresponding straight portion 255. However, when viewed in the same direction, a further portion 263 is inclined relative to the portion 262. The angle of inclination is preferably between 20° and 25° and, in the embodiment illustrated, is 22½°. The portions 262 and 263 are approximately equal in length.

When viewed in a direction perpendicular to the axis of rotation of the rake wheel (FIGURE 21) the two portions 262 and 263 are similarly inclined to the straight portion 255. The angle of inclination is preferably between 20° and 30° and, in the embodiment illustrated, is 25°. The tip 263A of each tine 254 is bent back in such a way that, viewed in the last-mentioned direction, it extends parallel to the straight portion 255. The arrangement of the whole rake wheel is such that the diameter of the felly 260 is equal, or approximately equal, to two-thirds of the diameter of the rake wheel itself.

The rake wheel is preferably mounted on an implement so as to be rotated in the direction indicated by the arrow D in FIGURE 20, the crop coming into engagement with the sides of the tines 254 which are remote from the plate 252; that is to say, the right-hand side in FIGURE 21. The portions 263 are inclined rearwardly with respect to the direction D and so are the straight portions 255 only to a lesser extent. This arrangement enhances shedding of any crop which may remain adhering to the tines 254 after they move upwardly away from the ground. The construction illustrated has been found to be very suitable for use in an implement having mechanically driven rake wheels, crop tending not to adhere to the tines 254 to any appreciable extent nor to become wound around or otherwise entangled with the rake wheels.

FIGURE 23 illustrates an implement in accordance with the invention having a main frame beam 264 and a parallel auxiliary frame beam in the form of a rod 265, these parts being interconnected by transverse coupling beams 266, 267, 268 and 269, the connections being by way of vertical shafts so that a pivotable parallelogram linkage is formed. The coupling beams 266, 267 and 268 have extensions 270, 271 and 272, respectively, upon which three rake wheels 273, 274 and 275 are respectively mounted. The rake wheels 273, 274 and 275 may be rotatably mounted either directly or in one of the ways previously described on the extension arms 270, 271 and 272 and are, in any case, adapted to be driven by ropes or the like 276, 277 and 278 which extend between pulleys incorporated with their hubs and three pulleys 282, 283 and 284 mounted on a rotatable shaft 285 extending parallel to the main frame beam 264. The ropes or the like 276, 277 and 278 pass around pairs of guide pulleys 279, 280 and 281, respectively. Any suitable means (not shown) is provided for coupling the leading end of the shaft 285 to the power take-off shaft of a tractor or other vehicle used to propel the implement over the ground.

The transverse coupling beam 269 is prolonged beyond the location of the vertical shaft by which it is coupled to the main frame beam 264 and a castor ground wheel 286 is provided adjacent its left-hand end considered in the intended direction of travel indicated by the arrow V in FIGURE 23. The opposite end of the beam 269 has a foot or plate 287 connected to it, the said foot or plate 287 being pivotable about a horizontal axis in such a way that, when the implement is not connected to a tractor or other vehicle, the foot or plate can be placed in an operative position in which it assists in supporting the implement on the ground (see FIGURE 26). The beam 269 carries a further upwardly arched beam 288 to the center of which a strip 289 is pivotally attached with the aid of a bracket 289A. The strip 289 is arranged to be capable of being pivotally connected to the free end of the upper lifting link 290 of the three-point lifting device of a tractor or other vehicle. A fastening plate 291 is secured to the uppermost end of the strip 289, the said plate having a recess in its edge in which recess a link of a chain 292 can be retainably engaged for a purpose which will hereinafter be described.

The rod 265 is prolonged beyond the vertical shaft connecting it to the transverse coupling beam 269 and, at the free end of the prolongation, it is pivoted to a transverse coupling beam 293 which is located, considered in the intended direction of travel V, a substantial distance to the front of the beam 269. The opposite ends of the beam 293 are provided with aligned horizontal pins 294 and 295 by which, as can be seen in dashed lines in FIGURES 25 and 26, the beam can be coupled to the free ends of the two lower lifting links of the lifting device of a tractor or like vehicle. The transverse beam 293 is also pivotally connected, adjacent the pin 294, to an arm 296 which extends parallel to the main frame beam 264. The end 297 of the arm 296 which is remote from the beam 293 is pivotally connected by a cranked rod 298 to the main frame beam 264 so that, effectively, the transverse beam 293 forms a part of the parallelogram linkage of the frame. A vertical pivot 296A connects the arm 296 to the beam 269 at the point where these two parts are in vertical register.

A castor ground wheel 299 is provided at the rearmost end of the implement, the said ground wheel being connected by way of a vertical shaft 306 (FIGURE 28) and a vertical tubular bearing 307 to a horizontal plate 301 in which a number of holes 300 are formed. The plate 301 is turnable about a vertical pivot 302 by which it is connected to the main frame beam 264. The plate 301 also carries a bent strip 303 which, at an intermediate point along its length, is coupled by a vertical pivot 304 to the rearmost end of the rod 265. A vertical locking pin 305 is provided for entry through one of the holes 300 and a single vertical hole formed through the beam 264 to retain the plate 301 in a corresponding angular setting about the shaft 302. Since the rod 265 is also linked to the plate 301 by the strip 303, the angular setting of the parallelogram linkage of the frame will be changed by turning the plate 301 about the shaft 302 and will be retained in a corresponding angular setting upon the insertion of the locking pin 305 through a chosen one of the holes 300.

As can be seen in FIGURE 28, the height of the frame of the implement relative to the ground can be changed by moving the shaft 306 axially in the tubular bearing 307. To this end, the upper extremity of the shaft 306 carries an upwardly inclined fork 308 between the limbs of which one end of a cable 309 is secured to a horizontal pin. The cable 309 passes around two guide pulleys 310 and 311 and its opposite end is fastened to one end of the chain 292 (see FIGURE 26). A strip 312 is also fastened to the upper end of the shaft 306 and extends downwardly parallel to the latter alongside the outer surface of the tublular bearing 307. The strip is formed with a number of vertically spaced holes 313 through any one of which a pin 314 can be entered for co-operation with a stop 315 projecting from the side of the tubular bearing 307.

When the implement is arranged as illustrated in FIGURE 23, it is adapted to function as a side-delivery rake, all the crop displaced by the rake wheels 273, 274 and 275 being formed into a single swath or windrow to the left of the rearmost rake wheel 273. It will be noted that the ground wheel 286 is located to the right of the central portion of the leading rake wheel 275 considered in the intended direction of travel V so that this ground wheel remains just clear of the strip of ground worked by the implement.

Upon withdrawing the locking pin 305 and pivoting the parallelogram linkage of the frame to the right, the implement can be retained in the working position shown in FIGURE 24 upon re-entry of the locking pin 305. In this working position, the implement is adapted to function as a tedder, each of the three rake wheels 273, 274 and 275 acting independently of its fellows to displace crop laterally to the left of the direction of the travel. The arrangement is such that, as can be seen in FIGURE 25, the pin 294 is located substantially nearer the ground wheel 286 when the implement occupies the working position shown in FIGURE 24 than when it occupies the working position shown in FIGURE 23. This is principally due to the fact that the coupling beam 293 is connected to the parallelogram linkage of the frame and moves to the left relative to the intended direction of travel V when the remainder of the frame is moved to the right.

The disposition of the whole implement is changed by bringing it from one working position to another but is such that, when operating as a tedder, the leading ground wheel 286 is still just clear of the crop which is worked by the implement. In this case, considered in the direction V, the said ground wheel 286 is disposed just to the left of the central region of the leading rake wheel 275. The upper lifting link 290 of the three-point lifting device to which the implement is connected can be of the kind containing a joint which allows its free end to move appreciable distances in horizontal directions. The said link will then co-operate satisfactorily with the part 289 in both the working positions illustrated and can remain connected to the said part while bringing the implement from one working position to the other.

When the front end of the implement is lifted by a three-point lifting device, the level which will be taken up by the rear part of the frame relative to the ground is adjusted by tensioning the cable 309. This moves the shaft 306 vertically relative to the bearing tube 307. The chain 292 can be engaged with the plate 291 in such a setting that the desired vertical level of the ground wheel 299 relative to the frame will be obtained. The pin 314 can, in addition, be entered through one of the holes 313 below the stop 315 in such a position that upward movement of the shaft 306 relative to the bearing tube 307 will be positively prevented beyond a given limit.

FIGURE 29 shows a modification of the arrangement illustrated in FIGURE 28 in which the end of the cable 309 is connected to one arm of a bell-crank lever 316 turnable about a horizontal pivot 318 supported by the plate 301. The other arm of the bell-crank lever 316 is connected to the bracket 308 by a further short cable 317. Vertical adjustment of the ground wheel 299 is effected in substantially the same manner as has already been described with reference to FIGURE 28. The pulleys, such as the pulley 311, are arranged in such positions relative to the parallelogram linkage of the frame that the vertical setting of the ground wheel 299 relative to the said frame is not altered to any appreciable extent when the parallelogram linkage is angularly adjusted to bring the implement from one working position to another.

What I claim is:

1. An implement of the kind set forth, comprising rake wheels arranged in a row, each of said rake wheels adapted to be driven through the intermediary of a rotatable shaft extending parallel to said row, the arrangement being such that the implement is selectively brought in side-delivery raking and tedding positions by pivoting said rake wheels about substantially vertical axes relative to the said shaft, the intended direction of rotation of said rake wheels being the same in both of the said working positions.

2. An implement as claimed in claim 1, including a main frame beam wherein each said rake wheel is pivotally connected to said main frame beam by an arm, and wherein the said rotatable shaft extends parallel to said main frame beam and is journalled in bearings or the like carried by that beam.

3. An implement as claimed in claim 2, wherein each said rake wheel is arranged to be driven by an endless means looped around a pulley mounted upon the said shaft and around a further pulley rigid with said rake wheel, each said endless means being guided around guide means arranged adjacent an axis about which said arm supporting the rake wheel is turnable.

4. An implement as claimed in claim 3, wherein said guide means is afforded by further pulleys.

5. An implement as claimed in claim 4, wherein said further pulleys are rotatable about an axis substantially coinciding with the axis about which said arm supporting the corresponding of said rake wheels is turnable relative to the remainder of the implement.

6. An implement as claimed in claim 4, wherein said guide means are freely displaceable along the pivotal axis with which they are associated.

7. An implement as claimed in claim 1, wherein each rake wheel is connected to a part of said implement through the intermediary of a supporting member which is turnable relative to the said part about an axis extending parallel to and spaced from the axis of rotation of said rake wheel.

8. An implement of the kind set forth which includes a frame and rake wheels, each of said rake wheels having pulley means secured to it, further pulley means being rotatably mounted on said frame, endless means connecting said further pulley means connected to each said rake wheel, each said rake wheel being rotatably mounted on a supporting member which is turnable relative to said frame about an axis which extends parallel to and spaced from the axis of rotation of said rake wheel, said latter axis also being spaced from said further pulley means mounted on said frame.

9. An implement as claimed in claim 8, wherein a spring mechanism is provided which is arranged to urge said supporting member in a given direction about the said axis.

10. An implement as claimed in claim 9, wherein said spring mechanism is arranged to urge said supporting member in a direction tending to tighten said endless means.

11. An implement as claimed in claim 10, wherein stop means associated with said supporting member is provided to limit the range of turning movement of said supporting member.

12. An implement as claimed in claim 10, wherein each of said rake wheels are located on relatively opposite sides of said supporting member from said pulley means.

13. For combination with a propelling vehicle including towing means, an implement for tedding and raking hay which comprises a generally horizontal main frame beam, an auxiliary frame beam parallel to said main frame beam, a plurality of substantially vertical pivot means associated with said frame beams, parallel coupling beams connecting said main frame beam to said auxiliary frame beam through said pivot means in a parallelogram arrangement coupling members provided on the forward of said coupling beams for detachably coupling the implement to said vehicle, a plurality of rake wheels disposed in echelon, a plurality of parallel arms extending from said main frame beam in a direction opposite from said auxiliary frame beams, each of said arms being firmly attached to one of said coupling beams and having one of said rake wheels mounted on its end away from said connection, and fixing means associated with said frame beams for selectively locking said parallelogram arrangement in at least two distinct working positions, said frame beams being pivotable together about the forward of said coupling beams wherein in the first of said working positions the implement is a tedder and in the second of said working positions the implement is a hay rake.

14. For combination with a propelling vehicle including towing means and power means, an implement for tedding and raking hay which comprises a generally horizontal main frame beam, a power shaft mounted on said main frame beam in parallel relationship therewith, said power shaft having a detachable connection for said power means, an auxiliary frame beam parallel to said frame beam, a plurality of vertical pivot means associated with said frame beams, parallel coupling beams connecting said main frame beam to said auxiliary frame beam through said pivot means in a parallelogram arrangement, coupling members provided on the forward of said coupling means for detachably coupling the implement to said vehicle, a plurality of rake wheels disposed in echelon, a plurality of parallel arms extending from said main frame beam in the direction opposite from said auxiliary frame beam, each of said arms being firmly attached to one of said coupling beams and having one of said rake wheels mounted on its end away from said connection, a plurality of rotating means carried by said power shaft and said rake wheels, power transmission means interconnecting said rotating means on said power shaft with said rotating means on each of said rake wheels, and fixing means associated with said frame beams for selectively locking said parallelogram arrangement in at least two working positions, said frame beams being pivotable together about the forward of said coupling beams wherein in the first of said working positions the implement is a tedder and in the second of said working positions the implement is a hay rake.

15. An implement as claimed in claim 14 wherein said rotating means comprises pulley means and said power transmission means comprises an endless member.

16. An implement as claimed in claim 15 wherein said rake wheels are mounted on said arms by crank means, the normal rotation of said rake wheels in contact with the ground tending to tighten said endless member relative to said pulley means.

17. For combination with a propelling vehicle, an implement of the kind set forth which comprises a generally horizontal main frame beam, an auxiliary frame beam substantially parallel to said main frame beam, a plurality of substantially vertical pivot means associated with said frame beams, substantially parallel coupling beams coupling said main frame beam and said auxiliary frame beam together through said pivot means in a parallelogram arrangement, a plurality of rake wheels disposed in echelon pivotably interconnected to one of said frame beams, a coupling member provided at the forward end of said implement for detachably coupling said implement to said vehicle, and locking means for selectably locking said parallelogram arrangement in at least two working positions.

18. An implement as claimed in claim 17, wherein said rake wheels are carried by arms that are connected to said main frame, both said rake wheels and said arms being located to the side of said main frame beam which is remote from said auxiliary frame beam.

19. An implement as claimed in claim 18, wherein said arms are pivotally connected to said main frame beam at points which coincide with said pivot means.

20. An implement as claimed in claim 17, wherein said rake wheels are driven by mechanical means.

21. An implement as claimed in claim 20, wherein said rake wheels are arranged to be driven through the intermediary of a rotatable shaft extending parallel to said main frame beam.

22. An implement as claimed in claim 17 wherein the frame beams are pivoted so that the implement can be changed from a side-delivery raking position in which the planes of rotation of said rake wheels are approximately parallel to said main frame beam to a tedding position in which the planes of rotation of said rake wheels are approximately perpendicular to said main frame beam.

23. An implement as claimed in claim 17, wherein said locking means comprises a number of telescopically arranged members provided with means to retain them in selected positions of extension relative to one another, the common longitudinal axis of these members being substantially inclined to said main and auxiliary frame beams, said members interconnecting said frame beams.

24. An implement as claimed in claim 23 wherein a first one of said telescopic members is mounted turnable relative to said main frame beam about an axis, a shaft mounted on said main frame beam, said axis coinciding with said shaft, one of said coupling beams being turnable relative to said main frame beam about said shaft, and wherein a second one of said telescopic members is mounted turnable relative to said auxiliary frame beam about an axis, said axis coinciding with a further shaft about which a further one of said coupling beams is also turnable relative to said auxiliary frame beam.

25. An implement as claimed in claim 17, wherein said locking means comprises a coupling rod pivotally connected to one of said frame beams, the arrangement being such that the coupling rod can be connected in a number of different locations formed on the other of the said frame beams whereby the positions of the said frame beams relative to each other can be retained in any one of a corresponding number of different settings.

26. An implement as claimed in claim 17, wherein a castor ground wheel is connected to said coupling beam farthest removed from the forward end of said implement.

27. An implement as claimed in claim 17 wherein a ground wheel with a plane of rotation angularly adjustable about a vertical axis is connected to the rearward of said coupling beams and means is provided to retain the plane of rotation of said ground wheel in at least one angular setting relative to said vehicle.

28. An implement as claimed in claim 17 wherein the rearmost of said rake wheels, considered in the intended direction of travel of said implement, is carried by an arm, and wherein the said arm also has a ground wheel connected to it.

29. An implement as claimed in claim 28, wherein the plane of rotation of said ground wheel is angularly adjustable about a vertical axis and means is provided to retain the plane of rotation in at least one angular setting relative to said arm.

30. An implement as claimed in claim 29, wherein the vertical axis about which the plane of rotation of said ground wheel is angularly adjustable is spaced from the longitudinal axis of the axle of said ground wheel.

31. An implement as claimed in claim 29 wherein the means by which the plane of rotation of the ground wheel can be retained in at least one angular setting relative to the frame is operable by the driver of said vehicle.

32. An implement as claimed in claim 17 wherein the forward of said coupling beams supports a castor ground wheel, the arrangement being such that the said ground wheel can be displaced laterally of the intended direction of travel of said implement relative to the forward of said coupling beams and can be selectively retained in any one of a number of positions of displacement.

33. An implement as claimed in claim 32, wherein an arm connects said ground wheel and the forward of said coupling beams, said arm being turnable about a vertical axis relative to the forward of said coupling beams and means being provided selectively to retain said arm in any one of a number of different angular settings about the said axis.

34. An implement as claimed in claim 17 wherein a castor ground wheel is connetced to said main frame beam at a location adjacent the forward of said coupling beams, the arrangement being such that the castor ground wheel is displaceable relative to said main frame beam in a direction transverse to the intended direction of travel of said implement, means being provided selectively to retain the said ground wheel in any one of a number of different positions of displacement.

35. An implement as claimed in claim 34, wherein an arm connects said ground wheel to said main frame beam, said arm being turnable relative to said main frame beam about a vertical axis, means being provided to retain said arm selectively in any one of a number of different angular settings about said vertical axis.

36. An implement as claimed in claim 17, wherein one of said coupling beams with which the leading of said rake wheels is connected has an extension carrying a castor ground wheel, the said castor ground wheel being located on that side of said auxiliary frame beam which is remote from said main frame beam.

37. An implement as claimed in claim 17, wherein a pivotable support plate for said implement is provided adjacent the forward of said coupling beams.

38. An implement as claimed in claim 17 wherein said coupling members can be selectively connected to said vehicle in at least two different positions spaced from one another in a direction transverse to the intended direction of travel of said implement.

39. An implement as claimed in claim 17 wherein said vehicle is a tractor with a lifting device and wherein a coupling piece is provided between said coupling members of the implement and said lifting device whereby said coupling piece pivots relative to said implement about a substantially horizontal axis, and wherein stops are provided limiting pivotal movement of said coupling piece relative to said implement in at least one direction whereby said implement may be lifting clear of the ground by said lifting device.

40. An implement as claimed in claim 17 wherein said implement includes a further frame beam extending above and parallel to the forward of said coupling beams, said further frame beam being provided with its own coupling members and the arrangement being such that said implement may be connected to said lifting device of said vehicle with the aid of both sets of said coupling members.

41. An implement as claimed in claim 40, wherein the vehicle includes a three-point lifting device and an intermediate piece is provided which is adapted to be arranged between coupling members of said implement and the upper lifting link of said lifting device, said intermediate piece being provided with parts which are so arranged that, when the aforesaid lifting device is operated, they come into abutting contact with the lower side of said further frame beam to which the associated of said coupling members are connected whereby pivotal movement of said implement about a substantially horizontal axis relative to said vehicle having the lifting device is limited.

42. An implement as claimed in claim 17, wherein an auxiliary coupling piece is provided which can connect said coupling members to a tow bar of said vehicle, said auxiliary coupling piece being turnable about a substantially horizontal axis relative to said implement.

43. An implement as claimed in claim 17 wherein an adjusting mechanism is provided between the forward of said coupling beams and said auxiliary frame beam, said adjusting mechanism being operable to turn said main and auxiliary frame beams about a substantially vertical axis to vary the working width of said implement.

44. An implement as claimed in claim 17 wherein a transverse beam is provided upon which a ground wheel is mounted, the said ground wheel being located, viewed in the intended direction of travel of said implement, in front of that one of the forward of said rake wheels.

45. An implement as claimed in claim 44, wherein the said transverse beam is so dimensioned and arranged that, when said implement occupies a working position in which it is adapted to function as a side-delivery rake, said ground wheel is located to one side of the strip of land which is worked by said rake wheels during operation of said implement.

46. An implement as claimed in claim 44 wherein the vehicle has a three-point lifting device and two of said coupling members for connection to the lower lifting links of said lifting device are arranged on a further transverse coupling beam, and wherein a further of said coupling members for connection to the upper lifting link of a lifting device is connected to said transverse beam upon which the said ground wheel is mounted.

47. An implement as claimed in claim 44 wherein the forward of said coupling beams is connected in said parallelogram arrangement by a further auxiliary beam extending parallel to said main and auxiliary frame beams.

48. An implement as claimed in claim 47, wherein one of said frame beams and said further auxiliary beam are connected to said transverse beam at points located at equal distances from the respective said coupling members.

49. An implement as claimed in claim 17 wherein a rotatable shaft is drivingly connected to the rake wheels, said shaft extending substantially parallel to the frame beams and arranged to be driven by a further shaft journalled in a housing, said housing being turnable about the longitudinal axis of the first-mentioned shaft, means being provided selectively to retain said housing in different angular settings about said longitudinal axis.

50. An implement as claimed in claim 17 wherein a rotatable shaft is drivingly connected to the rake wheels, said shaft being arranged to be driven by a further shaft which is located to the side of the main frame beam which is remote from the first-mentioned shaft.

References Cited by the Examiner
UNITED STATES PATENTS

| | | | |
|---|---|---|---|
| 960,950 | 6/1910 | Kesser | 56—366 |
| 1,049,823 | 1/1913 | Dillon | 56—322 |
| 1,104,749 | 7/1914 | Waterman | 56—322 |
| 2,436,475 | 2/1948 | Jones et al. | 56—377 |
| 2,722,799 | 11/1955 | Cooley | 56—400 |
| 2,874,529 | 2/1959 | Van der Lely et al. | 56—400 |

ANTONIO F. GUIDA, *Acting Primary Examiner.*

RUSSELL R. KINSEY, *Examiner.*